(12) United States Patent
Wood et al.

(10) Patent No.: US 10,502,263 B2
(45) Date of Patent: Dec. 10, 2019

(54) TURBOCHARGER WITH GAS AND LIQUID FLOW PATHS

(71) Applicant: Garrett Transportation I Inc., Torrance, CA (US)

(72) Inventors: Daniel Wood, Torrance, CA (US); Philippe Noelle, Vincey (FR); Xiao Lei Jin, Shanghai (CN)

(73) Assignee: Garrett Transportation I Inc., Torrance, CA (US)

( * ) Notice: Subject to any disclaimer, the term of this patent is extended or adjusted under 35 U.S.C. 154(b) by 114 days.

(21) Appl. No.: 15/675,429

(22) Filed: Aug. 11, 2017

(65) Prior Publication Data
US 2019/0048932 A1   Feb. 14, 2019

(51) Int. Cl.
| F16C 33/10 | (2006.01) |
| F01D 25/16 | (2006.01) |
| F01D 25/18 | (2006.01) |
| F04D 17/10 | (2006.01) |
| F04D 29/063 | (2006.01) |

(Continued)

(52) U.S. Cl.
CPC .......... *F16C 33/1045* (2013.01); *F01D 25/16* (2013.01); *F01D 25/18* (2013.01); *F01D 25/186* (2013.01); *F04D 17/10* (2013.01); *F04D 29/063* (2013.01); *F04D 29/083* (2013.01); *F02M 2026/001* (2016.02); *F05D 2220/40* (2013.01);
(Continued)

(58) Field of Classification Search
CPC ...... F01D 25/16; F04D 29/083; F04D 29/063; F04D 17/10; F16C 33/1045
See application file for complete search history.

(56) References Cited

U.S. PATENT DOCUMENTS

| 4,095,857 A * | 6/1978 | Palmer .................. F01D 25/186 |
| | | 184/6.11 |
| 4,613,288 A * | 9/1986 | McInerney ............. F01D 17/08 |
| | | 384/107 |

(Continued)

FOREIGN PATENT DOCUMENTS

| EP | 2 850 300 A1 | 3/2015 |
| EP | 2 850 300 B1 | 5/2017 |

(Continued)

OTHER PUBLICATIONS

English Translation JP-2015086705-A (Year: 2015).*
(Continued)

*Primary Examiner* — Mark A Laurenzi
*Assistant Examiner* — Shafiq Mian
(74) *Attorney, Agent, or Firm* — Brian J. Pangrle

(57) ABSTRACT

A turbocharger can include a housing that includes an interior cavity in fluid communication with a lubricant inlet and a lubricant outlet where, at a compressor side, the interior cavity includes an effective opening at a first axial face that spans an azimuthal angle about an axis of a through bore of the housing; a compressor side plate disposed at least in part in a compressor side recess of the housing; and a lubricant deflector plate disposed between the compressor side plate and the first axial face of the housing where the lubricant deflector plate includes an effective opening that substantially spans the azimuthal angle about the axis and where the lubricant deflector plate defines a seal cavity with respect to a compressor side seal recess of the housing.

17 Claims, 11 Drawing Sheets

(51) Int. Cl.
*F04D 29/08* (2006.01)
*F02M 26/00* (2016.01)

(52) U.S. Cl.
CPC .... *F05D 2240/58* (2013.01); *F05D 2260/602* (2013.01)

(56) References Cited

U.S. PATENT DOCUMENTS

| | | | |
|---|---|---|---|
| 4,664,605 A | 5/1987 | Asano et al. | |
| 4,704,075 A * | 11/1987 | Johnston | F01D 25/125 417/407 |
| 5,993,173 A * | 11/1999 | Koike | F01D 25/166 417/407 |
| 2012/0269624 A1 * | 10/2012 | Boening | F01D 25/168 415/229 |
| 2012/0308365 A1 * | 12/2012 | Woollenweber | F01D 25/16 415/170.1 |
| 2013/0089418 A1 * | 4/2013 | Boening | F01D 25/162 415/229 |
| 2013/0294948 A1 * | 11/2013 | Schumnig | F01D 25/16 417/407 |
| 2014/0369811 A1 * | 12/2014 | Malins | F02C 6/12 415/111 |
| 2014/0369865 A1 * | 12/2014 | Marsal | F01D 25/16 417/406 |
| 2015/0093233 A1 * | 4/2015 | Daguin | F01D 25/162 415/1 |
| 2015/0176593 A1 * | 6/2015 | Dayalan | F16C 17/10 415/1 |
| 2016/0298535 A1 * | 10/2016 | Hettinger | F01D 25/166 415/111 |
| 2019/0032936 A1 * | 1/2019 | Spain | F24F 7/013 |

FOREIGN PATENT DOCUMENTS

| | | |
|---|---|---|
| GB | 1 430 864 A | 4/1976 |
| JP | 2015086705 A * | 5/2015 |
| WO | 2013/173220 A1 | 11/2013 |

OTHER PUBLICATIONS

EP Application No. 18188024.6-1006, EPO Extended European Search Report (Search and Examination Report) dated Nov. 27, 2018 (8 pages).

* cited by examiner

TURBOCHARGER WITH GAS AND LIQUID FLOW PATHS

TECHNICAL FIELD

Subject matter disclosed herein relates generally to one or more components for turbochargers for internal combustion engines.

BACKGROUND

Exhaust driven turbochargers include a rotating group that includes a turbine wheel and a compressor wheel that are connected to one another by a shaft. The shaft is typically rotatably supported within a center housing by one or more bearings. During operation, exhaust from an internal combustion engine drives a turbochargers turbine wheel, which, in turn, drives the compressor wheel to boost charge air to the internal combustion engine.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Below, an example of a turbocharged engine system is described followed by various examples of components, assemblies, methods, etc.

Figure 1:
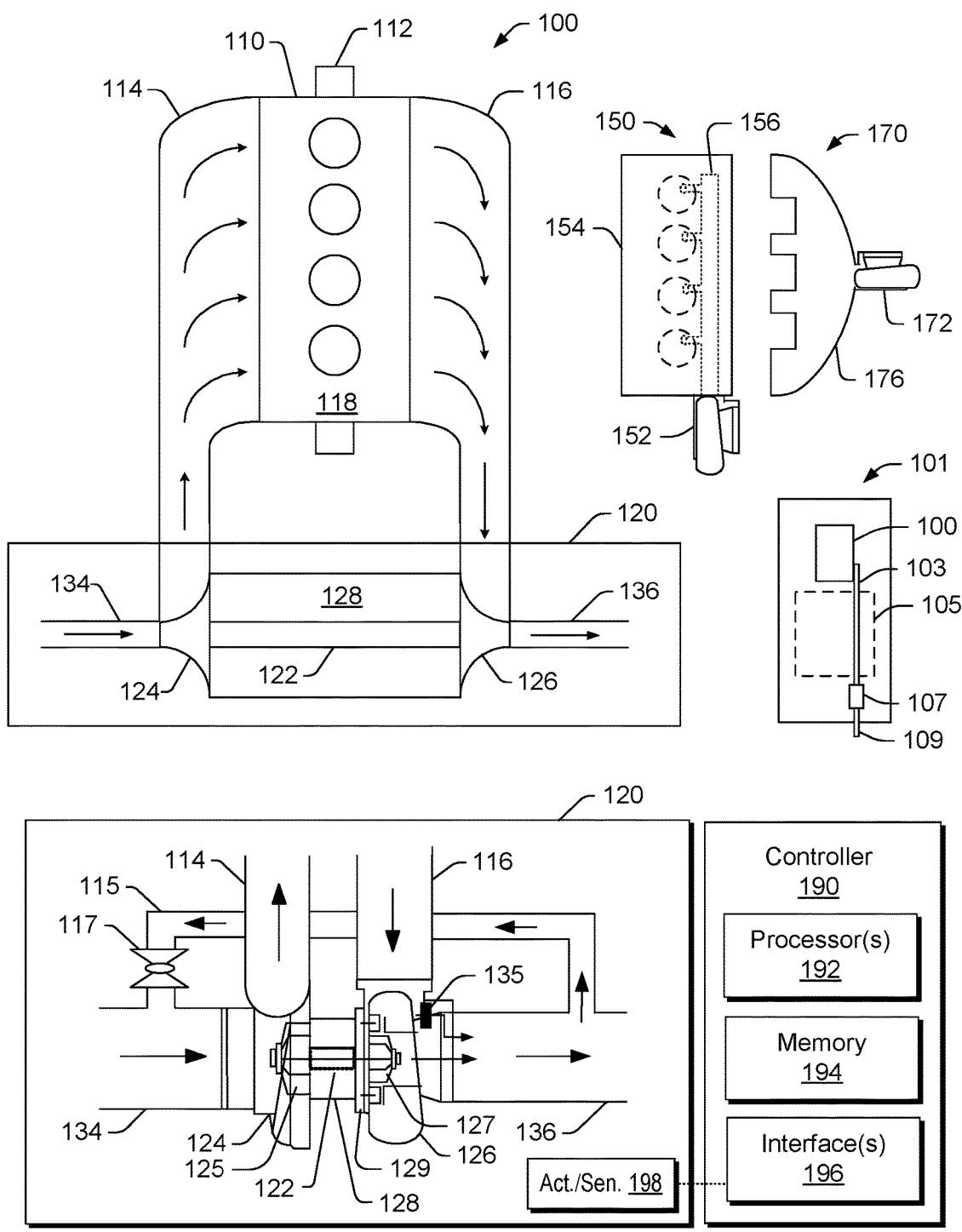
FIG. 1 is a diagram of a turbocharger and an internal combustion engine along with a controller.

Turbochargers are frequently utilized to increase output of an internal combustion engine. Referring to FIG. 1, as an example, a system 100 can include an internal combustion engine 110 and a turbocharger 120. As shown in FIG. 1, the system 100 may be part of a vehicle 101 where the system 100 is disposed in an engine compartment and connected to an exhaust conduit 103 that directs exhaust to an exhaust outlet 109, for example, located behind a passenger compartment 105. In the example of FIG. 1, a treatment unit 107 may be provided to treat exhaust (e.g., to reduce emissions via catalytic conversion of molecules, etc.).

As shown in FIG. 1, the internal combustion engine 110 includes an engine block 118 housing one or more combustion chambers that operatively drive a shaft 112 (e.g., via pistons) as well as an intake port 114 that provides a flow path for air to the engine block 118 and an exhaust port 116 that provides a flow path for exhaust from the engine block 118.

The turbocharger 120 can act to extract energy from the exhaust and to provide energy to intake air, which may be combined with fuel to form combustion gas. As shown in FIG. 1, the turbocharger 120 includes an air inlet 134, a shaft 122, a compressor housing assembly 124 for a compressor wheel 125, a turbine housing assembly 126 for a turbine wheel 127, another housing assembly 128 and an exhaust outlet 136. The housing assembly 128 may be referred to as a center housing assembly as it is disposed between the compressor housing assembly 124 and the turbine housing assembly 126.

In FIG. 1, the shaft 122 may be a shaft assembly that includes a variety of components (e.g., consider a shaft and wheel assembly (SWA) where the turbine wheel 127 is welded to the shaft 122, etc.). As an example, the shaft 122 may be rotatably supported by a bearing system (e.g., journal bearing(s), rolling element bearing(s), etc.) disposed in the housing assembly 128 (e.g., in a bore defined by one or more bore walls) such that rotation of the turbine wheel 127 causes rotation of the compressor wheel 125 (e.g., as rotatably coupled by the shaft 122). As an example a center housing rotating assembly (CHRA) can include the compressor wheel 125, the turbine wheel 127, the shaft 122, the housing assembly 128 and various other components (e.g., a compressor side plate disposed at an axial location between the compressor wheel 125 and the housing assembly 128).

In the example of FIG. 1, a variable geometry assembly 129 is shown as being, in part, disposed between the housing assembly 128 and the housing assembly 126. Such a variable geometry assembly may include vanes or other components to vary geometry of passages that lead to a turbine wheel space in the turbine housing assembly 126. As an example, a variable geometry compressor assembly may be provided.

In the example of FIG. 1, a wastegate valve (or simply wastegate) 135 is positioned proximate to an exhaust inlet of the turbine housing assembly 126. The wastegate valve 135 can be controlled to allow at least some exhaust from the exhaust port 116 to bypass the turbine wheel 127. Various wastegates, wastegate components, etc., may be applied to a conventional fixed nozzle turbine, a fixed-vaned nozzle turbine, a variable nozzle turbine, a twin scroll turbocharger, etc. As an example, a wastegate may be an internal wastegate (e.g., at least partially internal to a turbine housing). As an example, a wastegate may be an external wastegate (e.g., operatively coupled to a conduit in fluid communication with a turbine housing).

In the example of FIG. 1, an exhaust gas recirculation (EGR) conduit 115 is also shown, which may be provided, optionally with one or more valves 117, for example, to allow exhaust to flow to a position upstream the compressor wheel 125.

FIG. 1 also shows an example arrangement 150 for flow of exhaust to an exhaust turbine housing assembly 152 and another example arrangement 170 for flow of exhaust to an exhaust turbine housing assembly 172. In the arrangement 150, a cylinder head 154 includes passages 156 within to direct exhaust from cylinders to the turbine housing assembly 152 while in the arrangement 170, a manifold 176 provides for mounting of the turbine housing assembly 172, for example, without any separate, intermediate length of exhaust piping. In the example arrangements 150 and 170, the turbine housing assemblies 152 and 172 may be configured for use with a wastegate, variable geometry assembly, etc.

In FIG. 1, an example of a controller 190 is shown as including one or more processors 192, memory 194 and one or more interfaces 196. Such a controller may include circuitry such as circuitry of an engine control unit (ECU). As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate (e.g., via an actuator), an electric motor, or one or more other components associated with an engine, a turbocharger (or turbochargers), etc. As an example, the turbocharger 120 may include one or more actuators and/or one or more sensors 198 that may be, for example, coupled to an interface or interfaces 196 of the controller 190. As an example, the wastegate 135 may be controlled by a controller that includes an actuator responsive to an electrical signal, a pressure signal, etc. As an example, an actuator for a wastegate may be a mechanical actuator, for example, that may operate without a need for electrical power (e.g., consider a mechanical actuator configured to respond to a pressure signal supplied via a conduit).

Figure 2:
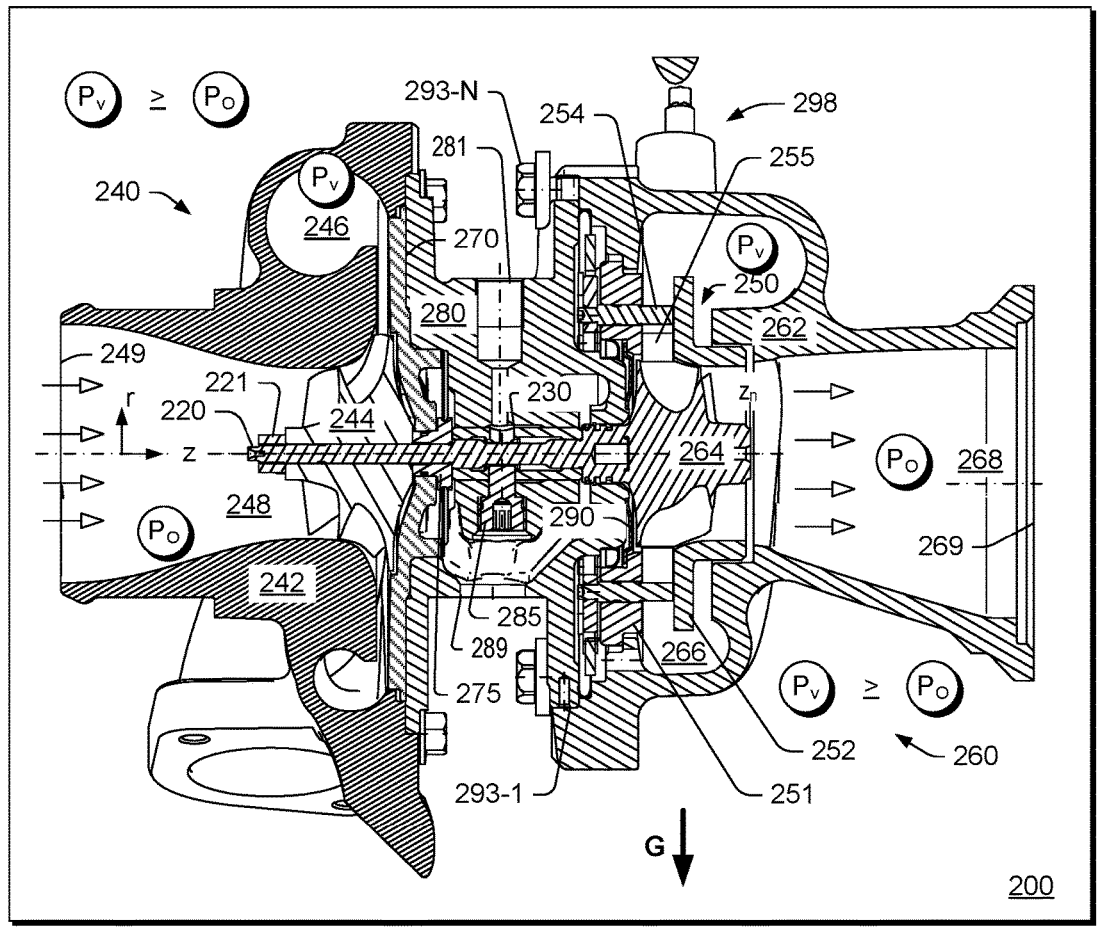
FIG. 2 is a cutaway view of an example of a turbocharger assembly.

FIG. 2 shows an example of a turbocharger assembly 200 that includes a shaft 220 supported by a bearing 230 (e.g., a journal bearing, a bearing assembly such as a rolling element bearing with an outer race, etc.) disposed in a bore (e.g., a through bore defined by one or more bore walls) of a housing 280 between a compressor assembly 240 that defines a compressor side (left) and a turbine assembly 260 that defines a turbine side (right). The compressor assembly 240 includes a compressor housing 242 that defines a volute 246 and that houses a compressor wheel 244. As shown in FIG. 2, the turbine assembly 260 includes a turbine housing 262 that defines a volute 266 and that houses a turbine wheel 264. The turbine wheel 264 may be, for example, welded or otherwise attached to the shaft 220 to form a shaft and wheel assembly (SWA) where a free end of the shaft 220 allows for attachment of the compressor wheel 244.

As to air flow, air can be directed to the volute 246 via a diffuser section defined in part by the compressor housing 242 and a compressor side plate 270 as the compressor wheel 244 rotates, drawing air into a passage 248 via an inlet 249, both of which may be defined by the compressor housing 242. As indicated in FIG. 2, during operation of the turbocharger 200, the compressor wheel 244 acts to boost air pressure such that air pressure in the volute 246 ($P_V$) is greater than air pressure in the passage 248 ($P_O$). Rotation of the compressor wheel 244 can generate a negative pressure that acts to "suck" air into the compressor assembly and to direct such air to the volute 246 via the diffuser section. As an example, where exhaust gas recirculation (EGR) is implemented, environmental air may be mixed with exhaust (e.g., upstream and/or downstream of the compressor wheel 244).

In the example of FIG. 2, an axial locating pin 285 is received in an opening of the bearing 230, which may be a cross-bore of the bearing 230. As an example, one or more other types of axial locating mechanisms may be included in a turbocharger that act to limit axial movement of a bearing (e.g., and/or movement in one or more other directions). As an example, a locating pin may allow for radial movement of a bearing, which may allow for effective operation of one or more lubricant films disposed about a surface of the bearing.

In the example of FIG. 2, the shaft 220 includes a step (e.g., a shoulder) that forms an axial annular face. In the example of FIG. 2, a thrust collar 275 (e.g., a type of collar) includes a surface that is seated against the axial annular face of the shaft 220. In such an example, a lock nut 221 can include threads that match threads of an end portion of the shaft 220 such that tightening of the lock nut 221 with respect to the shaft 220 loads the compressor wheel 244 and the thrust collar 275 against the axial annular face of the shaft 220, which can place the shaft 220 (e.g., from the step to its end portion) in tension. In such an example, the shaft 220, the compressor wheel 244 and the lock nut 221 can rotate as a unit (e.g., responsive to exhaust driving the turbine wheel 264). As shown in the example of FIG. 2, the compressor side plate 270 can include a bore (e.g., an opening) in which at least a portion of the thrust collar 275 is positioned where the thrust collar 275 (and/or the compressor side plate 270) can include a groove or grooves that may seat a seal element or seal elements (e.g., O-rings, piston rings, etc.).

The turbine assembly 260 further includes a variable geometry assembly 250, which may be referred to as a "cartridge" (e.g., the cartridge 250), that may be positioned using an annular component or flange 251 (e.g., optionally shaped as a stepped annular disc) of the cartridge 250 that clamps between the housing 280 and the turbine housing 262, for example, using bolts 293-1 to 293-N and a heat shield 290 (e.g., optionally shaped as a stepped annular disc), the latter of which is disposed between the cartridge 250 and the housing 280. As shown in the example of FIG. 2, the cartridge 250 includes a shroud component 252 and the annular component 251. As an example, one or more mounts or spacers 254 may be disposed between the shroud component 252 and the annular component 251, for example, to axially space the shroud component 252 and the annular component 251 (e.g., forming a nozzle space).

As an example, vanes 255 may be positioned between the shroud component 252 and the annular component 251, for example, where a control mechanism may cause pivoting of the vanes 255. As an example, the vane 255 may include a vane post that extends axially to operatively couple to a control mechanism, for example, for pivoting of the vane 255 about a pivot axis defined by the vane post.

As to exhaust flow, higher pressure exhaust in the volute 266 passes through passages (e.g., a nozzle or nozzles, a throat or throats, etc.) of the cartridge 250 to reach the turbine wheel 264 as disposed in a turbine wheel space defined by the cartridge 250 and the turbine housing 262. After passing through the turbine wheel space, exhaust travels axially outwardly along a passage 268 defined by a wall of the turbine housing 262 that also defines an opening 269 (e.g., an exhaust outlet). As indicated, during operation of the turbocharger 200, exhaust pressure in the volute 266 ($P_V$) is greater than exhaust pressure in the passage 268 ($P_O$).

As an example, exhaust pressure in the turbine assembly 260 can depend on position or positioning of the vanes 255. For example, closing and/or opening of the vanes 255 (e.g., narrowing or widening throats) can effect exhaust gas pressure, which may affect pressure at one or more turbine side seals. As an example, where pressure increases, a risk of exhaust flow from a turbine wheel space to an interior space of the housing 280 may increase.

As an example, a wheel, whether a turbine wheel or a compressor wheel, can include an inducer portion and an exducer portion, for example, characterized in part by an inducer radius ($r_i$) and an exducer radius ($r_e$). As an example, an individual blade can include an inducer edge (e.g., a leading edge) and an exducer edge (e.g., a trailing edge). A wheel may be defined in part by a trim value that characterizes a relationship between inducer and exducer portions.

During operation, the turbocharger 200 can generate a pressure differential between a compressor wheel space and an interior cavity of the housing 280 that functions as a lubricant cavity. For example, in the turbocharger 200, lubricant can flow into the housing 280 via an inlet 281 and can exit the housing 280 via an outlet 289; noting that the outlet 289 may be oriented downwardly with respect to gravity. Lubricant that enters the housing 280 can be directed via a lubricant bore (e.g., a lubricant passage) to a through bore of the housing 280 (e.g., to lubricate the bearing 230 for rotation of the shaft 220, etc.). At the through bore, lubricant can then flow to an interior cavity of the housing 280 via clearances defined between an outer surface of the bearing 230 and an inner surface of a through bore of the housing 280 (e.g., or via clearances between an inner surface of the bearing 230 and an outer surface of the shaft 220). Such lubricant, once in the interior cavity, can then flow to the outlet 289 where a conduit may provide for collecting and circulating the lubricant, for example, through a filter, a heat exchanger, etc. A pump (e.g., as electrically driven via an electric motor, mechanically driven via rotation of a crankshaft, etc.) may direct such lubricant via another conduit back to the inlet 281.

Leakage of lubricant, which may be a natural oil, a synthetic oil, a mixture of natural and synthetic oils, etc., may occur in a pressure driven manner where a seal mechanism leaks. While various types of seal mechanisms may leak at some predefined minimal level, a seal mechanism, in general, aims to minimize leakage.

As mentioned, where the pressure $P_o$, as shown in FIG. 2, is less than a pressure in an interior cavity of the housing 280, lubricant may flow in a direction from higher pressure to lower pressure. Such lubricant flow may be gas flow driven where lubricant moves with gas and/or is forced by gas (e.g., gas entrainment, lubricant mist in gas, etc.).

In the turbocharger 200 of FIG. 2, where a pressure differential exists, lubricant may flow through an opening in the plate 270 and to a compressor wheel space. Such lubricant may then be, detrimentally, drawn into one or more combustion cylinders of an internal combustion engine. In particular, lubricant that is present near the thrust collar 275 may flow (e.g., in a gas driven or other manner) between an outer surface of the thrust collar 275 and an inner surface of the opening of the plate 270, which receives at least a portion of the thrust collar 275. A seal mechanism in such an arrangement may include one or more seal elements (e.g., one or more piston rings, etc.) that are seated in a groove or grooves, which may be formed in the thrust collar 275 and/or may be formed in the plate 270. As shown in FIG. 2, the thrust collar 275 includes an axial face that can abut a base end of the compressor wheel 244. Thus, the thrust collar 275 can be disposed at least in part in an interior space and can be disposed at least in part in a compressor wheel space where a pressure differential can exist between those two spaces.

As an example, a turbocharger can include features that allow a cavity (e.g., an interior cavity) to "breathe" (e.g., communicate gas). Such features can include a compressor end lubricant seal deflector plate that will allow a volume, where one or more compressor end seal elements (e.g., one or more piston rings, etc.) are located, to "breathe." Such a mechanism can aim to allow pressure to equalize across axial sides of a seal plate, for example, without forcing or entraining a substantial amount of lubricant through the region that includes the one or more seal elements. Such an approach can aim to segregate gas and liquid (e.g., lubricant) such that flow of gas does not cause flow of liquid (e.g., lubricant).

As an example, a turbocharger can include features that can reduce lubricant leakage by allowing flow of gas, which can be turbine side exhaust gas (e.g., from a turbine exhaust gas volute, a turbine exhaust gas throat, a turbine wheel exhaust gas space, etc.), to flow to a compressor side (e.g., to a compressor wheel space). Such an approach may be referred to as a gas pressure equalization approach. Where gas pressure differentials can be reduced (e.g., dissipated, etc.) via such an approach, leakage of lubricant can be reduced. In particular, given an orientation with respect to gravity, a gas flow path may be in an upper portion (e.g., an upper half, etc.) of a center housing interior cavity while a lubricant flow path may be in a lower portion (e.g., a lower half, etc.) of the center housing interior cavity.

In various examples, features can be intended to be oriented with respect to gravity, as lubricant will flow under the influence of gravity; whereas, gravity has a lesser effect on gas due to a density difference between lubricant and gas: a lubricant can be a liquid (e.g., in a liquid state) that has a higher density than exhaust gas.

At temperatures above approximately 350 degrees C., the density of air can be less than 1 kg/m$^3$; whereas, the density of lubricant can be greater than approximately 500 kg/m$^3$. Thus, during operation of a turbocharger, the density of lubricant can be two orders of magnitude greater than the density of exhaust gas. As such, fluid dynamics can differ for flow of gas and flow of lubricant.

As an example, a turbocharger can include features that extend a lubricant opening azimuthally as measured about a rotational axis of a shaft of the turbocharger. For example, a seal plate (e.g., formed via a sheet metal piece, etc.) can include an opening (e.g., or openings) that extends far enough upwardly (e.g., clockwise and counter-clockwise) to be substantially above an area where lubricant may drain with respect to opposing sides of the seal plate. In such an example, lubricant can flow generally downwardly (e.g., radially downwardly away from a turbocharger shaft) with respect to gravity and gas can flow generally axially (e.g., in a direction with an axial component as defined by an axis of the turbocharger shaft) where, for example, overlap between flow paths may be minimal. As mentioned, features may promote gas flow predominantly along one or more upper paths and promote liquid flow (e.g., lubricant flow) predominantly along one or more lower paths.

As an example, a turbocharger can include a sealing mechanism that includes an effective open area that allows gas communication between a compressor and a turbine side of a center housing interior cavity of the turbocharger. Such communication paths can be imparted via a center housing casting process that can use a shaped core (e.g., a sand core, etc.) or cores. Once formed in the center housing, the communication paths can allow gas that may enter the center housing on the turbine side to travel to the compressor side.

As an example, a turbocharger can include gas flow paths and liquid flow paths that facilitate gas pressure equalization to help prevent a compressor seal element (e.g., piston ring) from pulling lubricant (fluid) out with it in the event that gas flow is traveling from a center housing to a compressor stage.

As an example, a seal element can be self-adjusting as to its diameter. For example, a seal element can include a gap between two ends or, for example, a seal element may include overlapping portions defined by a first end and a second end. In such examples, a seal element can include an uncompressed diameter (e.g., in a free state) and a smaller compressed diameter (e.g., in an installed state). When compressed to the smaller compressed diameter, the seal element, when seated in an annular groove, can exert a radially outwardly biasing force. For example, a piston ring may be seated in an annular groove of the thrust collar 275 where it applies a radially outwardly biasing force against a surface of the opening of the plate 270. Axially, the piston ring and at least a portion of the annular groove can overlap and may contact to form a seal (e.g., a labyrinth type of seal). As the shaft 220 of the turbocharger 200 can experience some amount of radial and axial movement, the piston ring may move as well. For example, the piston ring may move via compression and/or expansion radially and may move axially (e.g., toward or away from a compressor wheel space) depending on factors such as axial width of the annular groove of the thrust collar and axial width of the piston ring.

Movement of a piston ring may also be influenced by pressure, for example, when the pressure $P_o$ is less than an interior pressure of the housing 280, the piston ring may be pulled toward the compressor wheel space. Accordingly, a seal element may move responsive to one or more physical phenomena where movement can impact seal performance.

As mentioned, a turbocharger can include features that aim to promote flow of gas and that aim to hinder flow of liquid across a seal element or seal elements that are disposed about a shaft of a turbocharger such as, for example, disposed about a thrust collar where the thrust collar includes a through bore that receives the shaft therethrough. Such a seal element or seal elements can be for compressor side sealing and have to one side, a compressor wheel space, and, to an opposing side, an interior space. In general, the compressor wheel space is predominantly a gas flow space and the interior space is predominantly a liquid flow space where some amount of exhaust gas may flow where a turbine side seal mechanism experiences leakage (e.g., about one or more turbine side seal elements disposed about the shaft).

As an example, a turbocharger can include a lubricant deflector pocket and drain cavity that are sized to control and direct lubricant away from a compressor side seal and away from a seal plate pocket. In such an example, the compressor side seal can be formed via a plate and a collar that is fit onto a shaft of the turbocharger where one or more seal elements are disposed radially between a surface that defines an opening of the plate and an outer surface of the collar where the collar is disposed at least in part in the opening of the plate.

As explained, lubricant leakage can occur when gas is flowing from a center housing interior cavity of a turbocharger to a compressor stage of the turbocharger and when lubricant is in the vicinity of the gas such that the flowing gas can promote and/or entrain at least a portion of the lubricant.

As an example, a turbocharger can include features that aim to separate lubricant and gas and provide a communication path for gas to flow to a compressor side seal.

As an example, a housing may be formed via a casting process that may employ a core or cores. In such an example, the core or cores may impart a substantially symmetric interior cavity that effectively spans an azimuthal arc angle for flow of fluid even in situations when the housing is tilted at an angle with respect to gravity, for example, when a lubricant outlet is at an angle that is greater than approximately 10 degrees and less than approximately 90 degrees with respect to gravity where the angle can be referenced with respect to a rotational axis of a shaft of the turbocharger where the shaft operatively couples a turbine wheel and a compressor wheel. In such an example, the turbocharger can allow for more flexibility in mounting with respect to an engine compartment of a vehicle and/or allow for more flexibility as to vehicle operating conditions (e.g., as to slopes).

As an example, features of a turbocharger can reduce leakage of lubricant even when a negative pressure differential exists between a compressor wheel space and an interior space of a housing. Such features may reduce leakage to an essentially no leakage condition over a range of negative pressure differentials that may be experienced during operation of a turbocharger. As an example, a negative pressure differential may be in a range from approximately 0 Pa to approximately −20 kPa or more.

As an example, features of a turbocharge can be robust and reduce leakage of lubricant under conditions such as one or more of increased rotational speed of a turbocharger shaft, reduced lubricant viscosity and/or increased lubricant pressure (e.g., due to pump pressure at an inlet, back pressure at an outlet, etc.). Such factors can increase system energy, which can translate into a greater risk of lubricant leakage. Again, such features can reduce the risk of lubricant leakage even when energy to a turbocharger system is increasing. Such features may, for example, help to reduce risk of lubricant misting in an interior cavity of a housing of the turbocharger (e.g., by promoting segregation of gas and liquid flow paths).

As an example, a turbocharger can include a housing that includes an interior cavity in fluid communication with a lubricant inlet and a lubricant outlet where, at a compressor side, the interior cavity includes an effective opening at a first axial face that spans an azimuthal angle about an axis of a through bore of the housing; a compressor side plate disposed at least in part in a compressor side recess of the housing; and a lubricant deflector plate disposed between the compressor side plate and the first axial face of the housing where the lubricant deflector plate includes an effective opening that substantially spans the azimuthal angle about the axis and where the lubricant deflector plate defines a seal cavity with respect to a compressor side seal recess of the housing.

Figure 3:
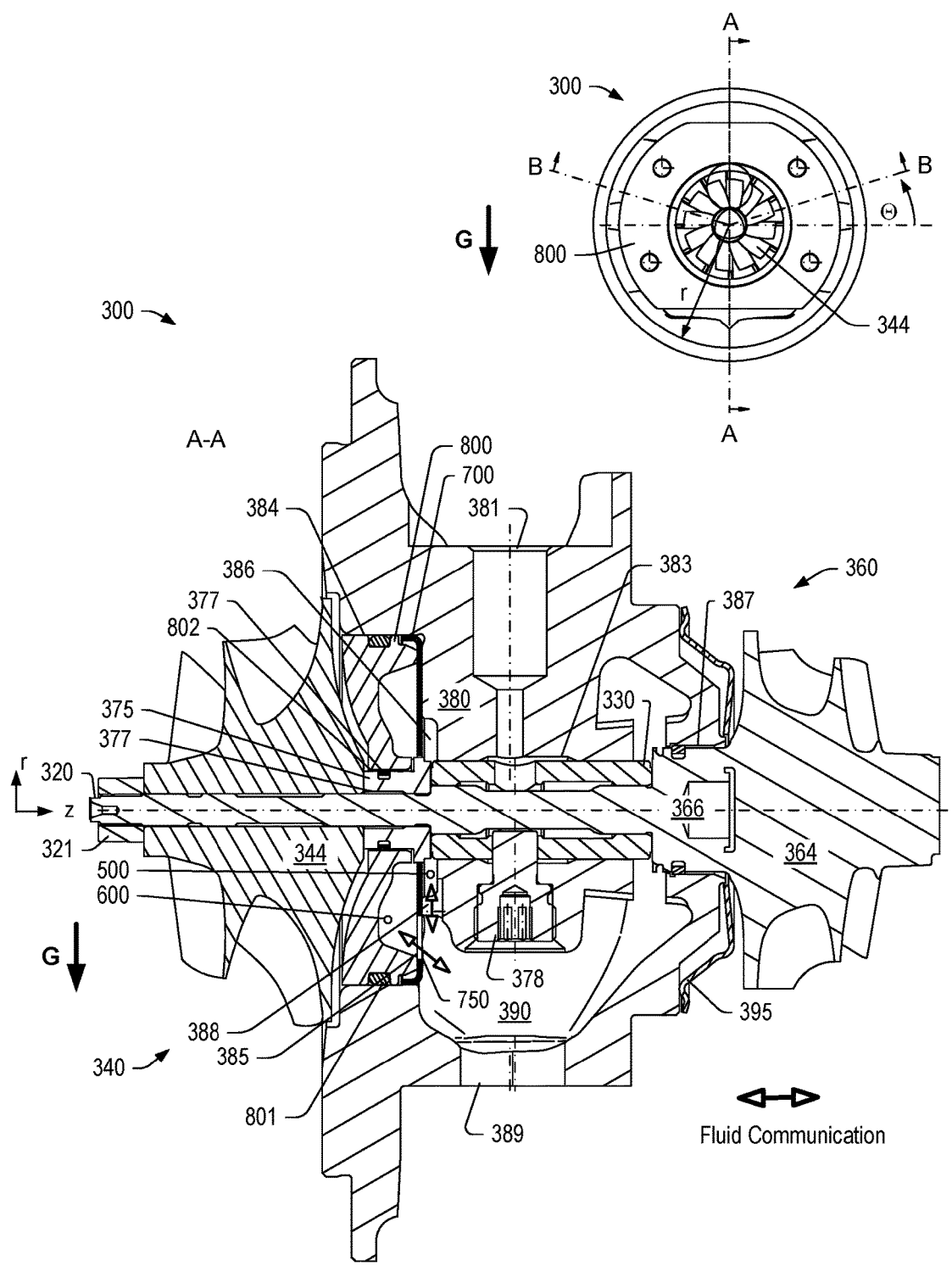
FIG. 3 is a cutaway view of an example of a turbocharger assembly that includes an example of a lubricant deflector plate.

FIG. 3 shows a cross-sectional view an example of a turbocharger 300 along a line A-A where the turbocharger 300 includes a housing 380 that includes a compressor side 340, a turbine side 360, a through bore 383 and 387 that extends between the compressor side 340 (e.g., as associated with a compressor assembly) and the turbine side 360 (e.g., as associated with a turbine assembly), a compressor side recess 384 defined in part by a first radius and a first axial face with respect to an axis of the through bore 383 and 387, a compressor side seal recess 386 defined in part by a second radius and a second axial face with respect to the axis where the compressor side seal recess 386 can includes a drain passage 388, a lubricant inlet 381, a lubricant outlet 389, and an interior cavity 390 in fluid communication with the lubricant inlet 381 and the lubricant outlet 389 where, at the compressor side 340, the interior cavity 390 includes an effective opening 385 at the first axial face that spans an azimuthal angle about the axis; a shaft and turbine wheel assembly 320, 364 and 366 (e.g., SWA) that includes a shaft free end and a turbine wheel end; a collar 375 that includes a bore 377 where the shaft 320 is received in the bore 377 of the collar 375; a compressor side plate 800 disposed at least in part in the compressor side recess 384 where the compressor side plate 800 includes an opening 802 and where the collar 375 is disposed at least in part in the opening 802; and a lubricant deflector plate 700 disposed between the compressor side plate 800 and the first axial face of the housing 380 where the lubricant deflector plate 700 includes an effective opening 750 that substantially spans the azimuthal angle about the axis and where the lubricant deflector plate 700 defines a seal cavity 500 with respect to the compressor side seal recess 386.

As shown in FIG. 3, the turbocharger 300 includes a portion 383 of the through bore that receives a journal bearing 330 and another portion 387 that receives a hub 366 of the shaft and turbine wheel assembly 320, 364 and 366 (e.g., SWA). In the example of FIG. 3, a compressor wheel 344 is received by the free end of the shaft 320 where a nut 321 or other coupling component is fit to operatively couple the compressor wheel 344 to the shaft 320. As an example, a compressor wheel can be a boreless compressor wheel where, for example, a shaft is inserted into a partial bore to couple the boreless compressor wheel to the shaft (e.g., consider a bore that does not extend the length of a compressor wheel).

In the example of FIG. 3, the journal bearing 330 can be located via a locating pin 378, which may be received in a bore of the housing 380 (e.g., orthogonal to the portion 383 of the through bore). As an example, such a bore may be a cross-bore as it intersects the through bore of the housing 380. The locating pin 378 may allow for movement of the journal bearing 330, particularly along an axis of the locating pin 378, which may provide for "floating" of the journal bearing 330 on a lubricant film that is formed between an outer surface of the journal bearing 330 and an inner surface of the housing 380 that defines the portion 383 of the through bore. Lubricant received via the inlet 381 can flow to a clearance or clearances between the housing 380 and the journal bearing 330 to lubricate the journal bearing 330 and, for example, to remove heat energy. Such lubricant can flow along various paths (e.g., clearances) and eventually collect in the interior cavity 390 where the lubricant may exit the housing 380 via the lubricant outlet 389. The locating pin 378, as received by the housing 380, can limit rotational movement and can limit axial movement of the journal bearing 330. The locating pin 378 can help to axially locate and azimuthally locate the journal bearing 330 when received at least in part in an opening of the journal bearing 330 as positioned in the portion 383 of the through bore of the housing 380.

At the turbine side 360, the turbocharger 300 is shown as including a heat shield 395, which can help to reject exhaust gas heat energy. At the turbine side 360, the hub 366 can include one or more annular grooves that can receive one or more seal elements that can hinder flow of exhaust gas from a turbine wheel space to the interior cavity 390 of the housing 380.

At the compressor side 340, a chamber 600 (e.g., a cavity) is shown as being defined in part by the compressor side plate 800 and the lubricant deflector plate 700. Such a chamber may be defined in part by a toroidal type of shape, for example, with one side relatively planar as defined by a side of the lubricant deflector plate 700 and another side being curved as defined by a side of the compressor side plate 800. As shown, the chamber 600 is in fluid communication with a clearance between the collar 375 and the compressor side plate 800. The clearance may be considered to be a gas flow clearance (e.g., a gas flow path) where gas may flow from the chamber 600 to a compressor wheel space (e.g., a space that is defined in part by a compressor wheel side surface of the compressor side plate 800 and that is defined in part by a surface of the compressor wheel 344). As shown in the example of FIG. 3, the clearance includes an annular opening portion that is disposed at an axial position that is between sides of the chamber 600 (e.g., axially between the compressor side plate 800 and the lubricant deflector plate 700).

As shown in the example of FIG. 3, the lubricant deflector plate 700 can define in part the chamber 600 and can define in part the seal cavity 500. As mentioned, the compressor side seal recess 386 can include the drain passage 388, which, as shown in FIG. 3, may be defined in part via the lubricant deflector plate 700.

FIG. 3 shows fluid communication arrows, which are double headed to indicate possible directions of fluid flow, noting that during operation a direction of flow may be predominantly unidirectional. As shown, fluid communication exists between the chamber 600 and the interior cavity 390 via the effective opening 750 of the lubricant deflector plate 700 and fluid communication exists between the seal cavity 500 and the interior cavity 390 via the drain passage 388, which can also be defined in part via the lubricant deflector plate 700. As an example, due at least in part to the shape of the effective opening 750 of the lubricant deflector plate 700, the turbocharger 300 may be installed in an engine compartment for an internal combustion engine and operated with an offset angle defined with respect to gravity (see, e.g., arrow labeled "G"). For example, an offset angle can be an angle that is an azimuthal angle in a cylindrical coordinate system with coordinates r, z and Θ where z is aligned with a longitudinal axis of a through bore of a housing that can receive a shaft, for example, rotatably supported by a bearing. Referring to the upper right view in FIG. 3, the offset angle may be clockwise or counter-clockwise such that the lubricant outlet 389 is shifted to the left or to the right of the line A-A, which is shown to be substantially aligned with gravity (e.g., zero offset or an offset angle of approximately 0).

As to the cylindrical coordinate system shown in FIG. 3, the radial coordinate r, the axial coordinate z and/or the azimuthal coordinate Θ may be utilized to define one or more features, one or more components, one or more directions of fluid flow, etc. For example, in the drain passage 388, flow is shown to be generally in a radial direction, which can be radially away from the z-axis toward the interior cavity 390. In such an example, lubricant (e.g., oil, etc.) may flow under the influence of gravity (G) and/or via lubricant pressure. As to the latter, pressure in a region defined at least in part by the bearing 330 may be greater than pressure in the interior cavity 390. In such an example, lubricant may flow from a higher pressure region to a lower pressure and, for example, under the influence of gravity.

As an example, lubricant can entrain gas (e.g., or vice versa), which can flow as a liquid and gas mixture (e.g., a multiphase mixture) where entrainment can be defined as the entrapment of one substance by another substance (e.g., due to contact during flow, mechanical movement, etc.). In the example of FIG. 3, liquid (e.g., lubricant) can be directed downwardly in a direction of the lubricant outlet 389 and gas (e.g., hot gas such as exhaust gas) can be directed in a direction generally away from the lubricant outlet 389. Where a liquid and gas mixture exists, which may be a type of foam, breaking can occur where gas is liberated (e.g., generally in one direction) and liquid is liberated (e.g., generally in a different direction). One or more features of the turbocharger assembly 300 (e.g., of the seal cavity 500, etc.) may act to break a liquid and gas mixture to facilitate separation (e.g., liberation of gas). In the example of FIG. 3, liberated gas may be considered to be "drier" and thereby reduce risk of carrying liquid as the gas flows.

As an example, the seal cavity 500 can include a gravity assisted coalescing zone (e.g., the drain passage 388) where such a zone can include surfaces that can direct flow of liquid in a direction aligned with gravity. Such surfaces may act as impingement and/or shearing surfaces that can help to promote separation of liquid and gas.

As an example, lubricant may be supplied to the housing 380 at the lubricant inlet 381 at a pressure as determined by a pump (e.g., an oil pump, etc.). Such a pump may be mechanically driven, electrically driven, etc. As an example, during operation, a supply pressure may be of the order of a bar or several bars (e.g., from about 10 psi to about 80 psi, which may depend on engine speed in rpm, etc.). As an example, a pressure at the lubricant outlet 389 may be approximately atmospheric. Where the lubricant outlet 389 is coupled to a conduit that may lead to a sump, during non-operational periods, the lubricant outlet 389 may be in fluid communication with the sump (e.g., and/or a crankcase) and, where the sump includes gas, the sump and the interior cavity 390 may be in gas communication. During non-operational periods, the housing 380 can be filled substantially with gas (i.e., as a material phase). As an example, during operational periods, gas may flow from a sump (e.g., and/or a crankcase) to an interior cavity of a turbocharger assembly. In such an example, the gas may flow along a path or paths that aim to reduce contact with liquid (e.g., lubricant). For example, such gas may flow upwardly in a housing (e.g., in a direction opposite to gravity) and then axially via one or more openings of a lubricant deflector plate (see, e.g., the opening 750 of the lubricant deflector plate 700).

During operation of a turbocharger assembly of an internal combustion engine, exhaust pressure may cause flow of gas past turbine end features (e.g., piston ring or rings set in annular channels of a hub portion of a shaft and turbine wheel assembly) into an interior space of a housing and, during operation, pressure in a compressor wheel space may be less than the pressure in the interior space of the housing such that gas is drawn from the interior space of the housing to the compressor wheel space. If liquid is present at or near the gas flow path and/or if liquid is entrained in the gas, the liquid (e.g., lubricant) may pass to the compressor wheel space. Such liquid may then flow through the compressor wheel space, to a volute and to an intake manifold of the internal combustion engine. The turbocharger assembly 300 of FIG. 3 includes features that can reduce flow of liquid to a compressor wheel space (e.g., reduce undesirable lubricant leakage).

In the example of FIG. 3, where a pressure differential exists across a length of the collar 375, gas may flow from the seal cavity 500 and/or from the chamber 600 to a compressor wheel space (e.g., within which the compressor wheel 344 is disposed). Flow paths associated with such flow may be "tight" to the collar 375, for example, within a radius from a central axis of the collar 375. In essence, the clearance between the collar 375 and the compressor side plate 800 at the compressor side 340 may be viewed as a vacuum source that can draw gas from the seal cavity 500 and/or from the chamber 600. Various features of the housing 380 and the lubricant deflector plate 700 aim to deflect lubricant away from such a gas flow path or paths (e.g., away from a suction opening).

As mentioned, an opening may be an annular opening as shown in the example of FIG. 3 where an axial extension of the compressor side plate 800 has an annular axial face that is disposed opposite an annular axial face of a shoulder portion of the collar 375. In such an arrangement, a clearance between the two annular axial faces forms an annular opening that can span 360 degrees about a rotational axis of the shaft 320 and be in fluid communication (e.g., gas and/or liquid) with the chamber 600. Such an annular opening can be radial whereas, for example, a clearance between the compressor side plate 800 and the collar 375 that is proximate to the compressor wheel 344 in fluid communication with a compressor wheel space can be an annular opening that can be axial (e.g., formed by an outer surface of the collar 375 and a bore surface of the compressor side plate 800 through which the outer surface of the collar 375 extends).

In FIG. 3, the compressor side plate 800 may, for example, have an outer diameter that is less than a diameter of the compressor wheel 344. Such an approach may be compared to that of the compressor side plate 270 of FIG. 2, which is shown to have a diameter that is larger than the diameter of the compressor wheel 244 and that includes a surface that forms part of a diffuser section between an exducer portion of the compressor wheel 244 and the volute 246. As an example, the compressor side plate 270 of FIG. 2 may be a cast component (e.g., formed via metal or alloy casting) that is finish machined (e.g., as to one or more features) and, as an example, the compressor side plate 800 may be a machined component, for example, machined from a stock piece of material (e.g., metal or alloy stock). In the example of FIG. 3, the housing 380 includes an annular face that is recessed to accommodate a back side of the compressor wheel 344 where an annular shoulder transitions to another annular face that can form a surface of a diffuser section for diffusion of energy as gas flows from an exducer portion of the compressor wheel 344 to a volute. As an example, the approach of FIG. 3 may allow for a smaller diameter compressor side plate, which may optionally be a machined plate. A smaller diameter (e.g., smaller than a compressor wheel diameter) can allow for a joint to be formed with a housing that is likewise at a diameter that is less than a diameter of a compressor wheel.

In the example of FIG. 3, the compressor side plate 800 is shown as being received by the housing 380 to an axial depth that is greater than an axial dimension of the compressor side plate 800 such that the compressor side plate does not extend beyond the compressor side of the housing 380. In such an example, the compressor wheel 344 may be recessed with respect to the housing 380. For example, the compressor wheel 344 may be recessed such that a portion of a hub of the compressor wheel 344 at its maximum diameter is inset from a compressor side of the housing 380. Such an approach may allow for a shorter overall length of a turbocharger center housing rotating assembly (CHRA), which may be beneficial for purposes of balance (e.g., lessening of vibration, etc.). As an example, the mass of the compressor side plate 800 of FIG. 3 may be less than that of the compressor side plate 270 of FIG. 2. As an example, the compressor side plate 800 of FIG. 3 may be more rigid than the compressor side plate 270 of FIG. 2, for example, due to the compressor side plate 800 being smaller in diameter and/or being received in a recess of the housing 380 at its perimeter. As an example, the compressor side plate 800 of FIG. 3 may be in a more homogeneous environment as to temperature during operation when compared to the compressor side plate 270 of FIG. 2, which being larger in diameter with respect to its compressor wheel 244 may experience temperature-related stress and/or strain.

As an example, a subassembly can include a compressor side plate such as the compressor side plate 800 and a lubricant deflector plate such as the lubricant deflector plate 700. Such a subassembly can be tailored for receipt by a recess of a center housing of a turbocharger such as the housing 380. In such an example, the center housing may be a cast housing (e.g., with finish machining) where an opening can be defined by an arc span in a number of degrees about a bearing bore axis of the center housing where overlap occurs with one or more openings in a lubricant deflector plate to allow for passage of gas (e.g., and/or other fluid).

As an example, a subassembly may include a collar such as a thrust collar that can be received by an opening of a compressor side plate and an opening of a lubricant deflector plate. Such a collar may define an axial spacing between a hub side of a compressor wheel and a compressor side of a bearing such as, for example, a journal bearing. In such an example, the collar may include a portion that extends axially toward the journal bearing and away from a surface of the lubricant deflector plate and may include another portion that extends axially toward the compressor wheel and away from a surface of the compressor side plate. As an example, such a collar may be fit to a shaft of a turbine wheel and shaft assembly (SWA) such that the collar rotates. In such an example, lubricant that contacts a portion of the collar may be subject to such rotation and flung away from the collar, for example, into a cavity such as, for example, the seal cavity 500. As an example, a clearance may exist from time-to-time between an axial face of a collar and an axial face of a journal bearing where lubricant can flow in the clearance. As an example, a collar and/or a journal bearing may include features such as channels, grooves, etc., that allow for flow of lubricant. In such an example, lubricant may flow from an inner radial position to an outer radial position during operation. As an example, such lubricant may be ejected radially outwardly (e.g., due to rotational movement of one or more components, pressure, etc.).

As shown in the example of FIG. 3, the collar 375 can include a portion that is in the cavity 500 and a portion that is in the chamber 600 where the lubricant deflector plate 700 divides at least a portion of the cavity 500 from at least a portion of the chamber 600.

Figure 4:
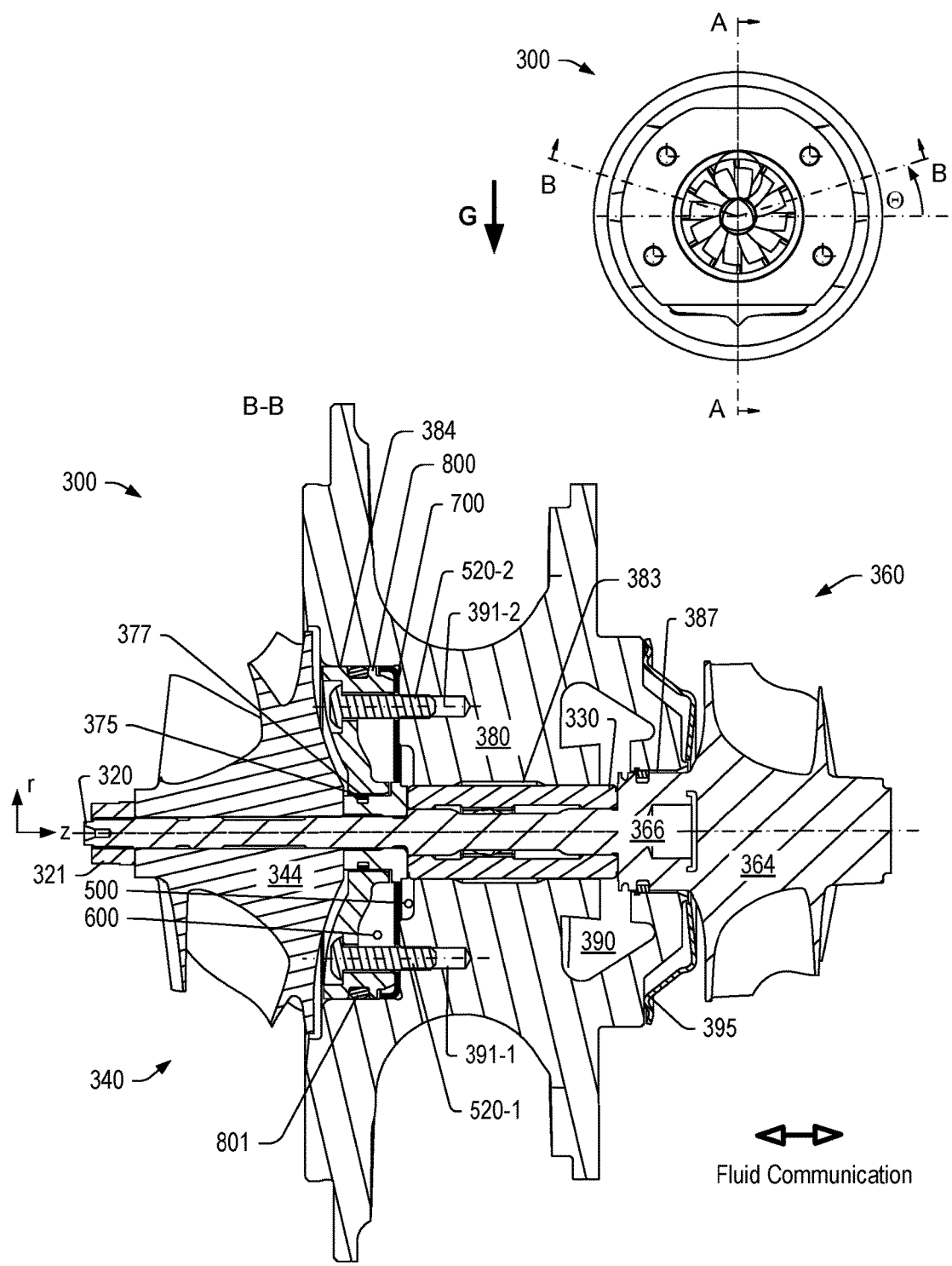
FIG. 4 is cutaway view of the turbocharger assembly of FIG. 3.

FIG. 4 shows a cross-sectional view of the turbocharger 300 along lines B-B as connected at the axis. In the view of FIG. 4, the example turbocharger 300 is shown as including threaded bores 391-1 and 391-2 that can receive bolts 520-1 and 520-2, respectively, that can secure the compressor side plate 800 to the housing 380. As shown in FIG. 4, the seal cavity 500 and the chamber 600 extend into an upper half of the turbocharger 300 as oriented with respect to gravity. Lubricant in the seal cavity 500 can be directed downwardly with respect to gravity (e.g., to flow via the drain passage 388) at least in part by the presence of the lubricant deflector plate 700.

Figure 5:
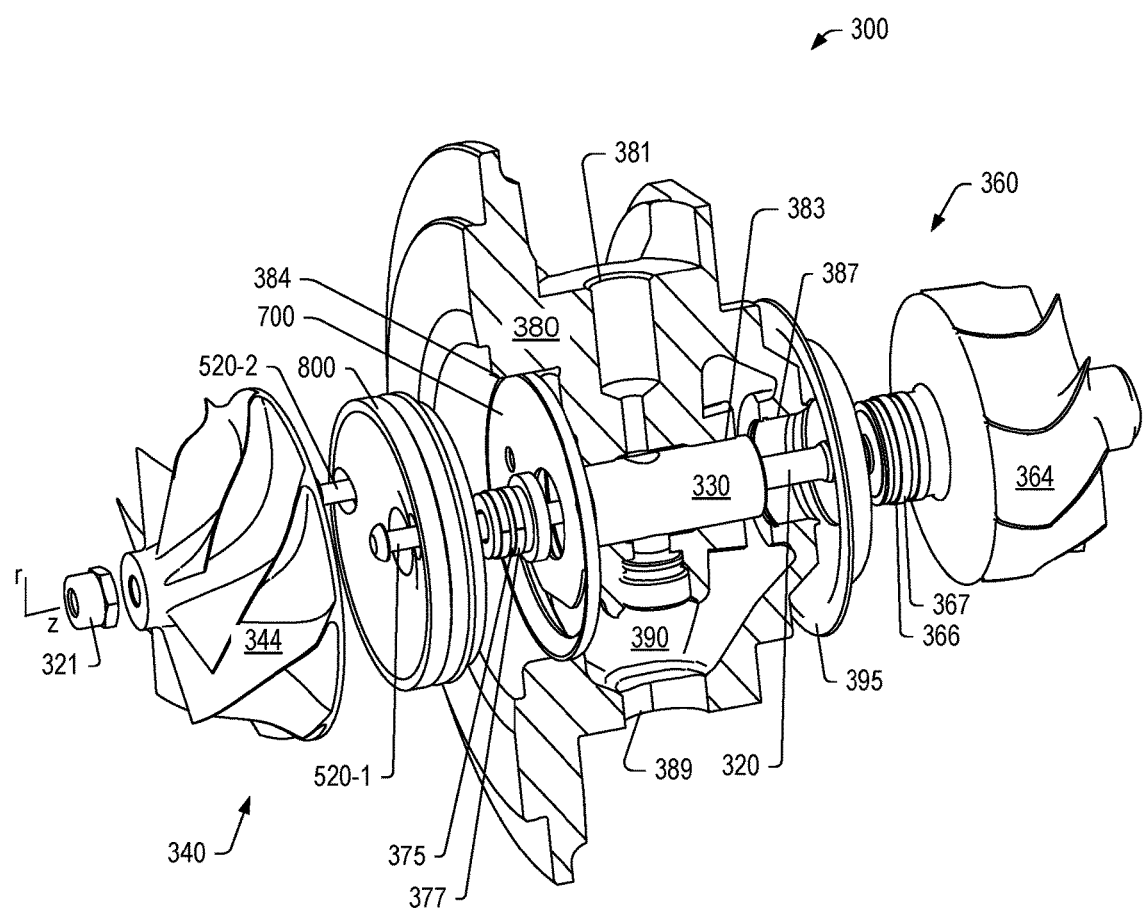
FIG. 5 is an exploded cutaway, perspective view of the turbocharger assembly of FIG. 3.

FIG. 5 shows an exploded, perspective, cut-away view of the turbocharger 300. As shown in FIG. 5, the lubricant deflector plate 700 can be disposed between the compressor side plate 800 and the housing 380 where the bolts 520-1 and 520-2 can secure the compressor side plate 800 to the housing 380 and act to azimuthally locate the lubricant deflector plate 700. As shown, the bolts 520-1 and 520-2 are positioned to assure two possible orientations of the lubricant deflector plate 700, both of which place the effective opening 750 on the side of the lubricant outlet 389. Depending on features of the lubricant deflector plate 700, one orientation may be proper and the other improper. For example, the lubricant deflector plate 700 can include a lip (e.g., a rim, etc.) that is to extend axially in one direction. In the example of FIG. 5, the lubricant deflector plate 700 includes a rim that properly extends toward the compressor side plate 800. For a lubricant deflector plate without such a feature, depending on one or more other features, it may be properly fit in one of two orientations (e.g., consider a relatively flat lubricant deflector plate without a lip).

FIG. 5 also shows the collar 375 as including a shoulder that forms a radial extension with an annular radial surface that is of a diameter that is larger than a bore diameter of the compressor side plate 800. FIG. 5 further shows the lubricant deflector plate 700 as including an opening that is of a diameter that is larger than the diameter of the annular radial surface of the radial extension of the collar 375. As such, in the example of FIG. 5, the collar 375 can pass through the opening of the lubricant deflector plate 700 but not the bore of the compressor side plate 800 (e.g., only a portion of the collar 375 can pass into the bore of the compressor side plate 800, optionally to an extent where is emerges from a compressor wheel side of the compressor side plate 800 as shown in FIG. 3 and FIG. 4).

Figure 6:
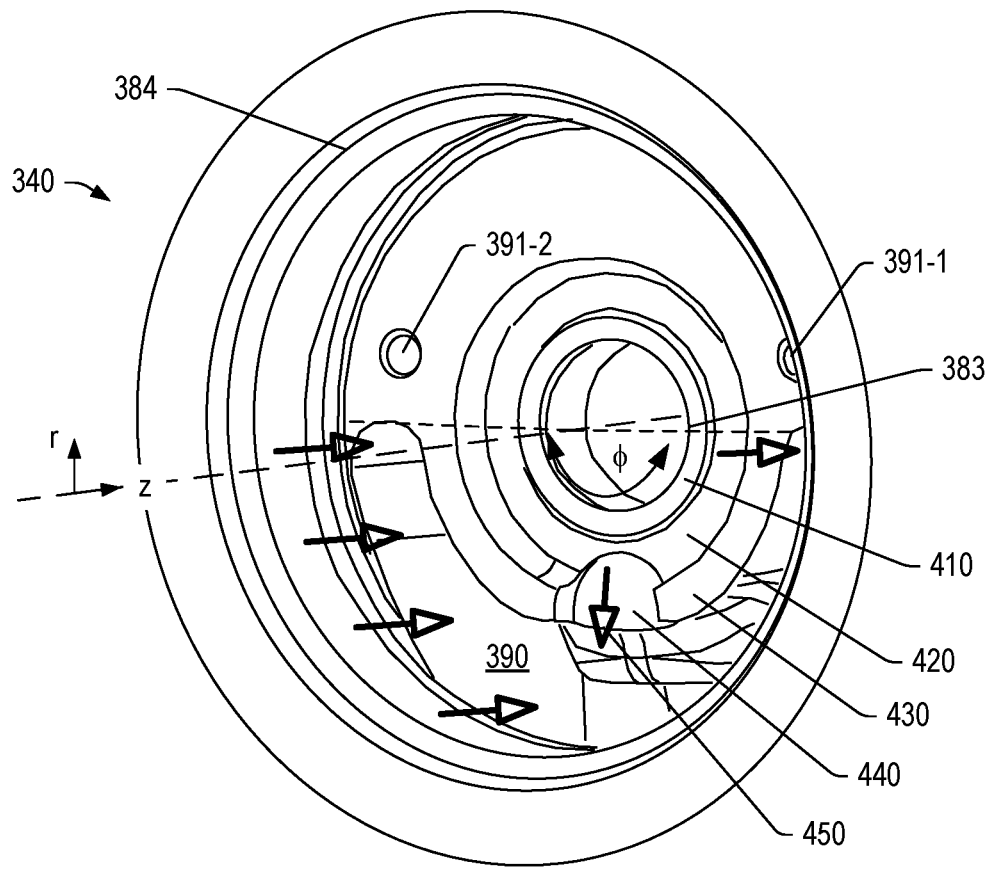
FIG. 6 is a perspective end view of an example of a portion of a compressor side of a housing.
Figure 6:
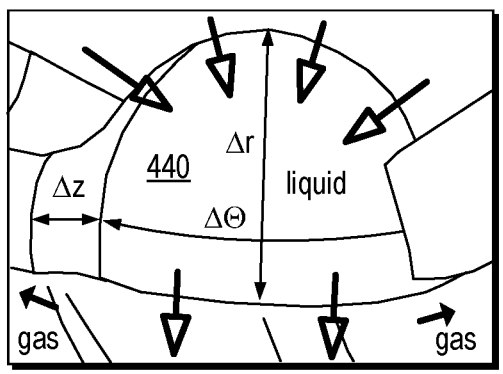

FIG. 6 shows a perspective view of a portion of the compressor side 340 of the housing 380. As shown, the effective opening 450 can be a single contiguous opening defined by a boundary. As an example, the effective opening 450 may be formed via a plurality of openings where the plurality of openings effectively define the effective opening with respect to an azimuthal angle. In FIG. 4, an azimuthal angle φ is shown as being defined with respect to an axis of the through bore portion 383. As shown, the azimuthal angle is approximately 180 degrees.

FIG. 6 also shows an axially outwardly extending annular axial face 410 disposed about an end opening of the through bore portion 383, a recessed axial face 420, which may include a curved cross-sectional profile, the axial face 430, which defines in part the recess 384, and a recessed surface 440 that defines in part the drain passage 388. Various features of the compressor side 340 of the housing 380 may be defined with respect to a cylindrical coordinate system (e.g., r, z, Θ).

As to the example of FIG. 6, when not in operation, the seal cavity 500 can fill with gas as lubricant (liquid) can drain from the seal cavity 500 under the influence of gravity. During a start-up phase (e.g., operational phase), lubricant that flows to the seal cavity 500 may mix with the gas and become "foamy". As mentioned, various features of a turbocharger assembly can help to promote separation of gas and liquid (e.g., lubricant) and direct flow of gas and liquid in desired directions. Such features can help to diminish flow of liquid with flow of gas (e.g., diminish detrimental liquid flow to one or more regions exterior to a bearing housing). As mentioned, one or more features may allow for orientation of a turbocharger assembly in a greater range with respect to gravity, which may facilitate arranging components in an engine compartment of a vehicle with a turbocharged internal combustion engine.

In the example of FIG. 6, the recessed surface 440 together with the lubricant deflector plate 700 can form the drain passage 388 through which lubricant may flow with some amount of gas (e.g., consider a start-up phase, etc.). As shown, the effective opening 450 of the housing 380 extends azimuthally, clockwise and counter-clockwise, from an exit of the drain passage 388 formed by the recessed surface 440 and the lubricant deflector plate 700 such that gas, that may exit with the lubricant, may flow azimuthally away from the exit of the drain passage 388, for example, as indicated by small arrows in FIG. 6. In the example of FIG. 6, the recessed surface 440, and hence the drain passage 388, may be defined in a cylindrical coordinate system where an axial depth can be represented by $\Delta z$, a gravity flow length can be approximated by $\Delta r$ and a width can be approximated by $\Delta \Theta$. As an example, the drain passage 388 may be defined by a volume and/or a cross-sectional flow area. As an example, the drain passage 388 may be defined with respect to an intended orientation with respect to gravity, optionally with limits as to deviation (e.g., +/−a number of degrees). As an example, the drain passage 388 may be defined with respect to the effective opening 450, optionally in conjunction with one or more of the aforementioned metrics (e.g., volume, flow area, orientation, etc.). As an example, a turbocharger assembly can include a seal cavity defined by a volume and a drain passage defined by a cross-sectional flow area that is substantially orthogonal to gravity. In such an example, fluid in the seal cavity can exit via the drain passage where the fluid may be liquid or liquid and gas.

FIG. 6 shows various flow path arrows that can represent lubricant flow paths that aim to direct lubricant to the interior cavity 390 of the housing 380. Once in the interior cavity 390, the lubricant may then flow to the lubricant outlet 389 of the housing 380.

As mentioned, the drain passage 388 can be formed at least in part by the lubricant deflector plate 700. For example, a portion of the lubricant deflector plate 700 can be seated against the axial face 430 of the housing 380 and be axially spaced from the axial face 410 of the housing 380. In such an arrangement, the lubricant deflector plate 700 can define in part the seal cavity 500 that can receive lubricant that flows across the axial face 410 to enter the seal cavity 500, which can then drain via the drain passage 388 to the interior cavity 390 of the housing 380.

While FIG. 6 shows the axial face 410, as an example, a housing may be without such an axial face where the recessed axial face 420 extends to the opening of the portion 383 of the through bore of the housing 380.

As mentioned, the housing 380 can include a recess that is of a sufficient axial depth to receive the compressor side plate 800 where the axial depth may be greater than a maximum axial dimension of the compressor side plate 800. As an example, a recess of a housing can be sufficiently axially deep to receive a subassembly of a compressor side plate and a lubricant deflector plate such that the subassembly does not protrude past a compressor side of the housing. In such an example, the recess may be of a diameter that is less than a maximum diameter of a compressor wheel.

Figure 7:
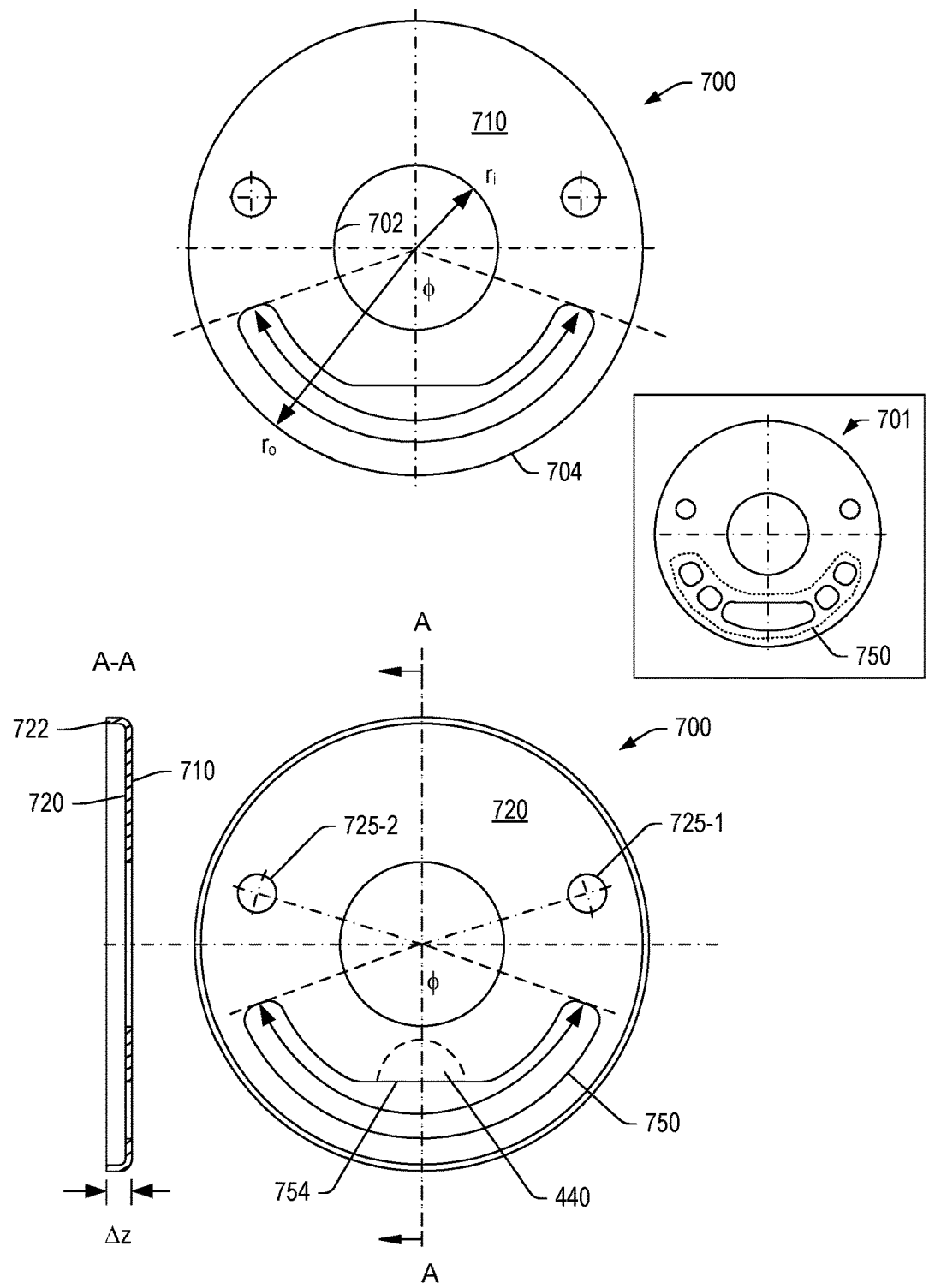
FIG. 7 is a series of views of examples of a lubricant deflector plate.

FIG. 7 shows various views of an example of the lubricant deflector plate 700 as including various features as well as an outline of the recessed surface 440 of the housing 380 as shown in FIG. 6. In particular, FIG. 7 shows two side views and a cross-sectional view along a line A-A.

Additionally, FIG. 7 shows an example of a lubricant deflector plate 701 that includes the effective opening 750 as being defined by a plurality of individual openings that span an azimuthal angle about the z-axis (see, e.g., dotted line that surrounds the plurality of individual openings). As shown, two distal openings can define the span where such openings can allow for passage of gas (e.g., primarily gas, etc.). The effective opening 750 of the example lubricant deflector plate 701 also include a lowermost opening (e.g., as may be defined with respect to gravity) that can provide a flow path lubricant and/or gas.

As shown in FIG. 7, the lubricant deflector plate 700 can include an opening 702 and an outer perimeter 704, a housing side 710 and a compressor wheel side 720 (e.g., a compressor side plate side), bolt openings 725-1 and 725-2 and the effective opening 750 (e.g., an effective opening area as may be defined in two-dimensions). In the example of FIG. 7, the lubricant deflector plate 700 includes a lip 722, which may be referred to as a rim. As shown, the lip 722 increases the overall thickness of the lubricant deflector plate 700 along the z dimension (e.g., axial dimension). As mentioned, a lubricant deflector plate may be manufactured and utilized without such a feature (e.g., consider the example of FIG. 7 where the lubricant deflector plate does not include the lip 722).

As shown in FIG. 7, the effective opening 750 can be a single contiguous opening defined by a boundary, which may include, for example, curved and/or flat portions (see, e.g., the flat portion 754 as may be associated with a drain passage). As an example, the effective opening 750 may be formed via a plurality of openings where the plurality of openings effectively define the effective opening with respect to an azimuthal angle. In FIG. 7, an azimuthal angle $\phi$ is shown as being defined with respect to an axis of the opening 702, which upon assembly, can be substantially aligned with the axis of the through bore portion 383 of the housing 380. As shown, the azimuthal angle is approximately 150 degrees. As an example, the span of the opening 750 may be tailored (e.g., selected) based at least in part on orientation of a turbocharger in an engine compartment as defined with respect to gravity. For example, where an offset with respect to gravity exceeds approximately 15 degrees, the opening 750 can be, in a clockwise and/or counter-clockwise direction, greater than approximately 15 degrees. As an example, the opening 750 may be asymmetric and selected to be asymmetric based in a direction of tilt with respect to gravity.

In the example of FIG. 7, the opening 750 includes an end at approximately −20 degrees (e.g., 340 degrees) and another end at approximately 200 degrees, for an angular span of approximately 140 degrees. As an example, the opening 750 (e.g., effective opening) may span a number of degrees, for example, in a range of approximately 90 degrees or more (e.g., up to approximately 200 degrees). As an example, the opening 750 (e.g., effective opening) may span a number of degrees, for example, in a range of approximately 110 degrees to approximately 180 degrees. As an example, a number of degrees may be selected based at least in part on a desired orientation of a turbocharger assembly in an engine compartment. As an example, a lubricant deflector plate may be symmetric (e.g., and optionally oriented in one of two orientations with respect to opposing sides) or may be asymmetric (e.g., to be oriented in a single orientation). As an example, a lubricant deflector plate can include an asymmetric opening that extends in an azimuthal direction that allows for orienting a turbocharger assembly in an engine compartment with respect to gravity in that azimuthal direction (e.g., a clockwise direction or a counter-clockwise direction).

As an example, the effective opening 750 can substantially span an effective opening of a housing (see, e.g., the effective opening 450 as shown in FIG. 6) when the azimuthal span of the effective opening 750 is at least approximately 50 percent or more of the azimuthal span of the effective opening of the housing. For example, where an interior cavity of a housing includes an effective opening (e.g., at an axial face) that spans an azimuthal angle of approximately 180 degrees about an axis of a bearing bore of the housing, an effective opening of a lubricant deflector plate that has an azimuthal span of approximately 90 degrees or more substantially spans the azimuthal angle of approximately 180 degrees. A span of an effective opening of a lubricant deflector plate may be aligned (e.g., centered) or, for example, optionally misaligned (e.g., rotated), with respect to an effective opening of a housing. As an example, a misalignment may be utilized where an orientation with respect to gravity (e.g., of a drain of a housing) is known. In such an example, an effective opening of a lubricant deflector plate may optionally be centered with respect to gravity while an effective opening of a housing may be off-center with respect to gravity.

As mentioned, the lubricant deflector plate 700 can be dimensioned and positioned to form a passage with the recessed surface 440 of the housing 380, for example, as shown in the example of FIG. 6. FIG. 3 shows the seal cavity 500 and the drain passage 388 where the drain passage can be formed by the recessed surface 440 and a portion of the lubricant deflector plate 700. As mentioned, the lubricant deflector plate 700 can also define in part the seal cavity 500. Thus, the lubricant deflector plate 700 may define (e.g., form) one or more fluid cavities, chambers, passages, etc. with respect to one or more other components. In such an example, such features may be for gas, liquid (e.g., liquid lubricant), gas and liquid, primarily gas, primarily liquid, etc. As an example, one or more of such features may be formed to be utilized in a particular oriented with respect to gravity or, for example, in a range of angles with respect to gravity (e.g., as may be referenced with respect to an outlet such as the outlet 389 of the housing 380).

Various features of the lubricant deflector plate 700 can be defined with respect to a cylindrical coordinate system. For example, the opening 702 can be defined by the radius $r_i$ and the outer perimeter 704 can be defined by the radius $r_o$. As shown, the lip 722 can be defined in part by an axial dimension $\Delta z$ and, for example, a thickness between sides 710 and 720 of the lubricant deflector plate 700.

Figure 8:
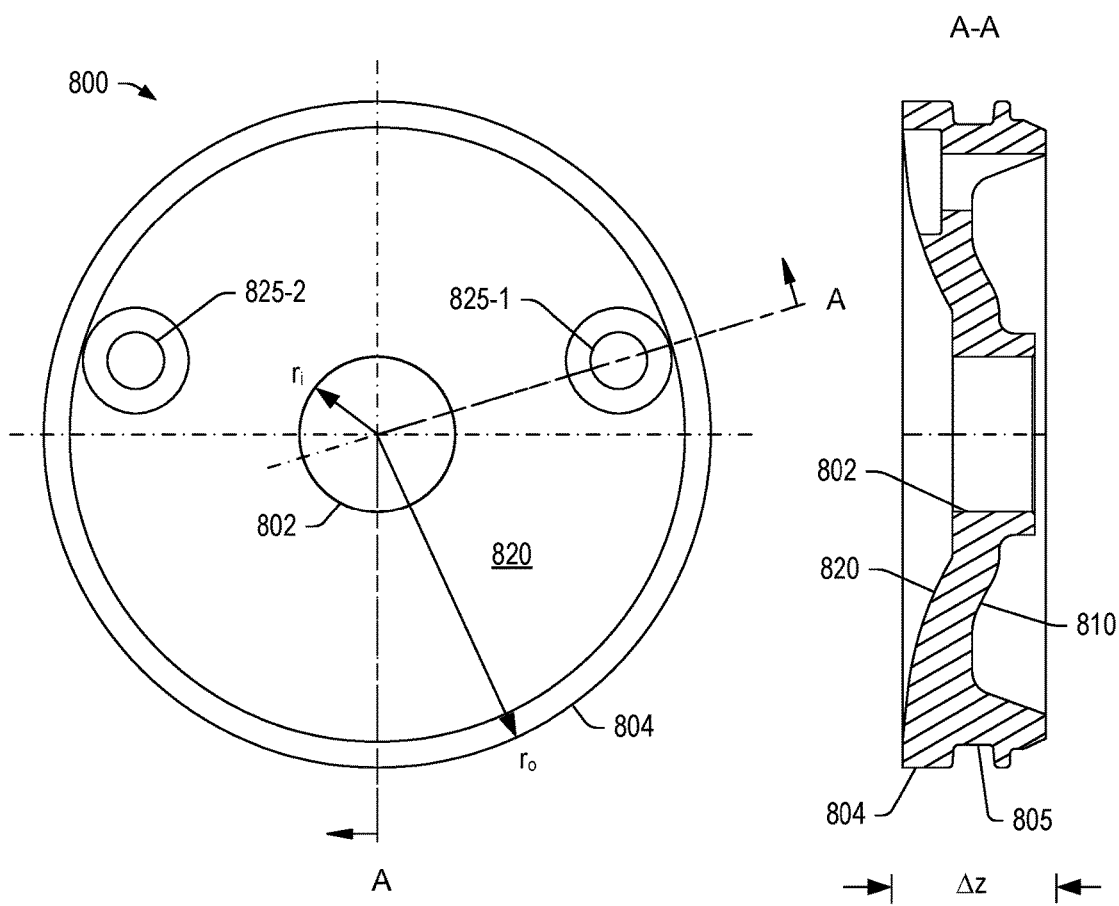
FIG. 8 is a series of views of an example of a compressor side plate.

FIG. 8 shows an example of the compressor side plate 800. In particular, FIG. 8 shows a compressor side view and a cross-sectional view along lines A-A. As shown, the compressor side plate 800 includes an opening 802, an outer perimeter 804, one or more annular grooves 805, a housing side 810 (e.g., a lubricant deflector plate side), a compressor wheel side 820 and bolt openings 825-1 and 825-2 that can receive bolts to secure the compressor side plate 800 to a housing (e.g., the housing 380). As an example, such bolts may also secure the lubricant deflector plate 700 to the housing. In such an arrangement, the lubricant deflector plate 700 can be sandwiched between the compressor side plate 800 and the housing 380.

As mentioned, a seal element may be received in the groove 805 where the seal element contacts a surface of the recess 384 of the housing 380. Such a seal can hinder flow of fluid between the outer perimeter 804 of the compressor side plate 800 and the housing 380.

Various features of the compressor side plate 800 can be defined with respect to a cylindrical coordinate system. For example, the opening 802 can be defined by the radius $r_i$ and the outer perimeter 804 can be defined by the radius $r_o$. As shown, the compressor side plate 800 can be defined in part by an axial dimension $\Delta z$ and, for example, one or more thickness between sides 810 and 820.

Figure 9:
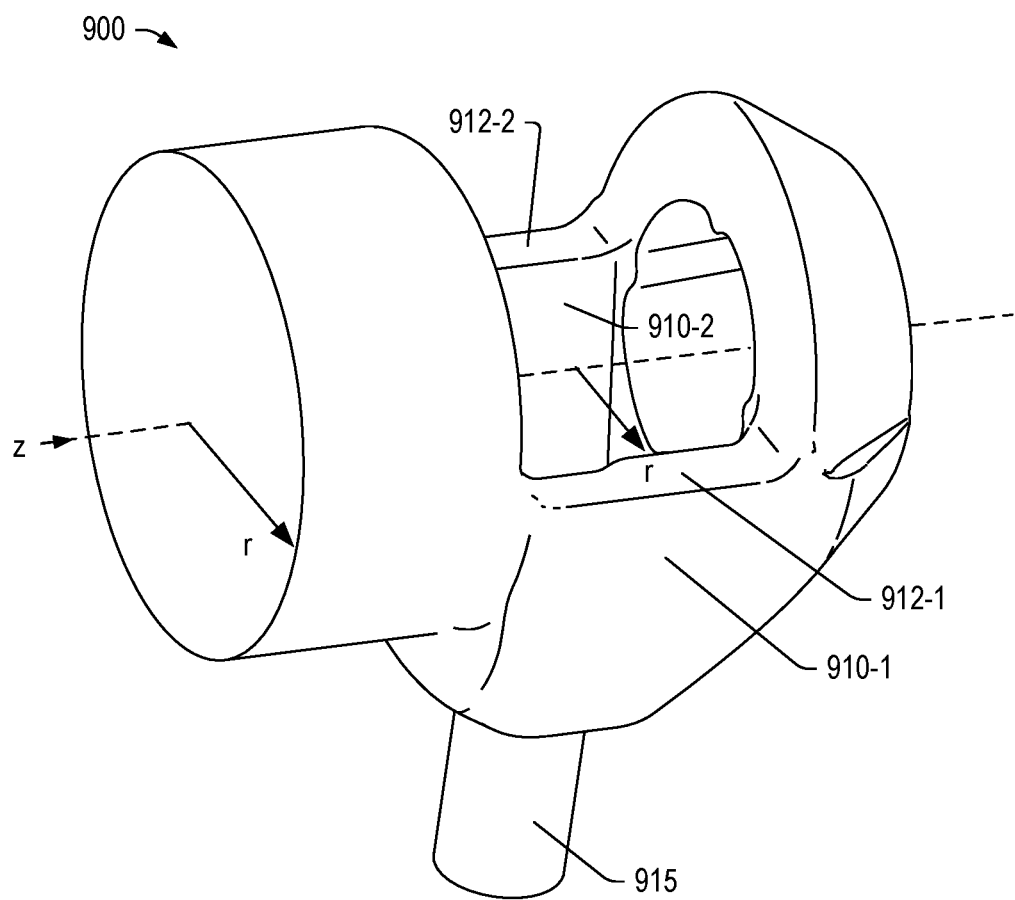
FIG. 9 is a perspective view of an example of a core that can be utilized to cast a housing.

FIG. 9 shows a perspective view of an example of a core 900 that may be a unitary core for casting a housing such as the housing 380. As shown, the core 900 includes a substantially U shaped portion with legs 910-1 and 910-2 that span an axial length and that rise to respective ends 912-1 and 912-2. The core 900 further includes an outlet portion 915 that can be utilized to cast a housing with a lubricant outlet such as the outlet 389 of the housing 380. As an example, the core 900 can form the interior cavity 390 of the housing 380. In the example of FIG. 9, the negative spaces of the core can form in part a bearing boss portion of the housing 380 where the through bore portion 383 extends through the bearing boss portion.

Figure 10:
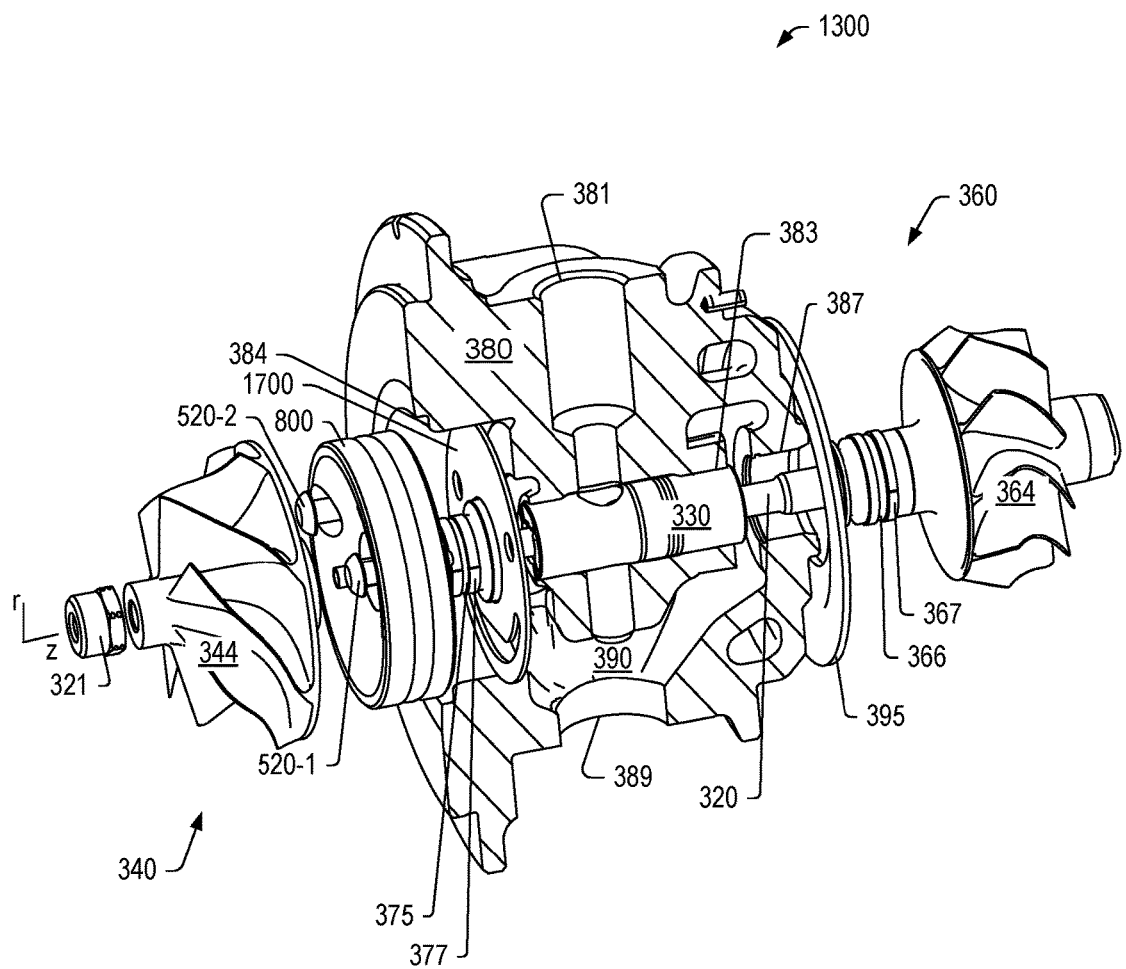
FIG. 10 is an exploded cutaway view of an example of a turbocharger assembly that includes an example of a lubricant deflector plate.

FIG. 10 shows an example of an exploded, cutaway view of another turbocharger assembly 1300 where reference numerals as in FIG. 5 refer to like components and/or features (e.g., with respect to function) while an example lubricant deflector plate 1700 differs from the example lubricant deflector plate 700 of the example of FIG. 5, particularly in that the lubricant deflector plate 1700 does not include the lip 722.

Figure 11:
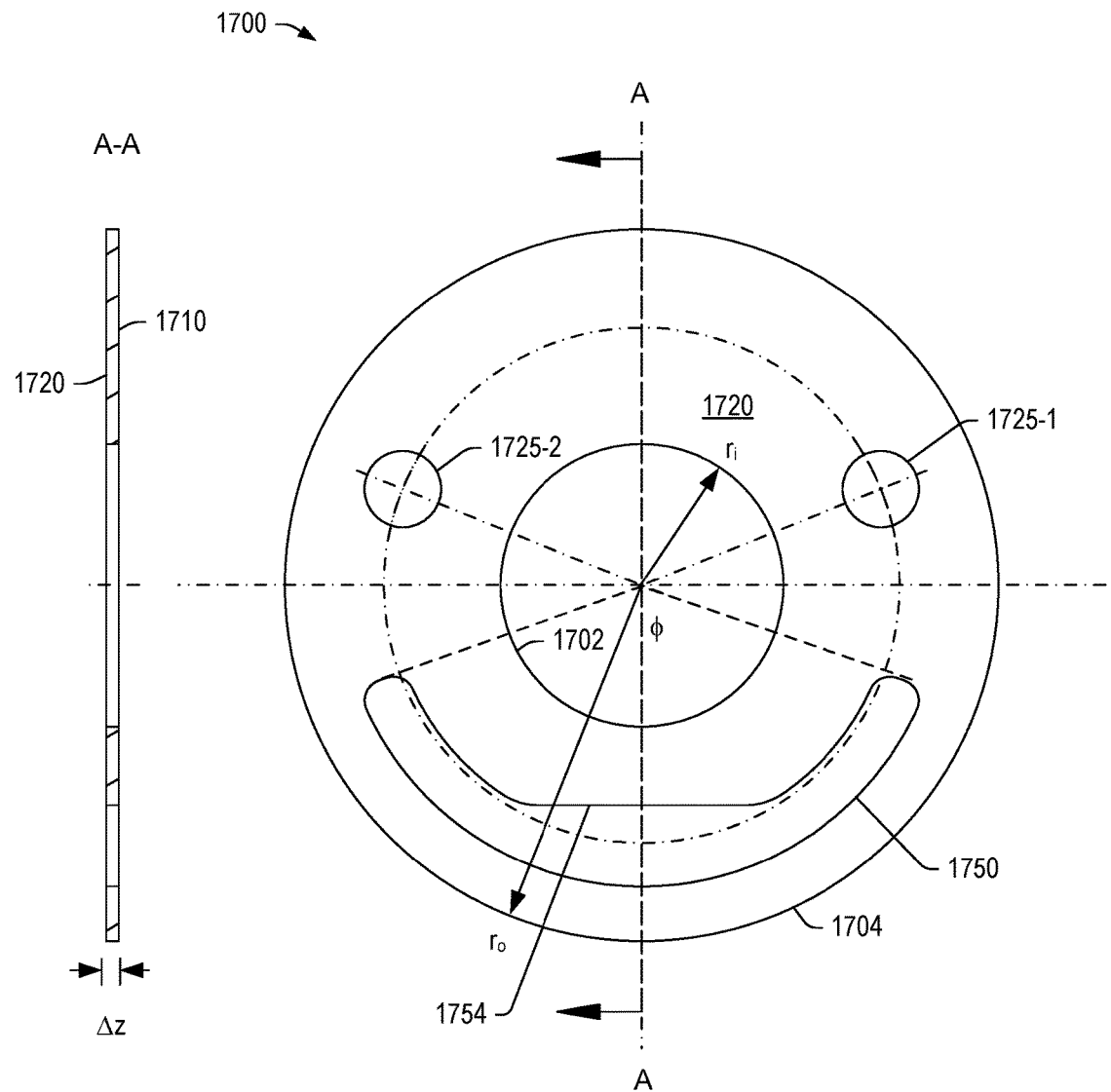
FIG. 11 is a series of views of an example of a lubricant deflector plate.

FIG. 11 shows various views of an example of the lubricant deflector plate 1700 as including various features. In particular, FIG. 11 shows a side view and a cross-sectional view along a line A-A.

As shown in FIG. 11 the lubricant deflector plate 1700 can include an opening 1702 and an outer perimeter 1704, a side 1710 and a side 1720, bolt openings 1725-1 and 1725-2 and an effective opening 1750 (e.g., an effective opening area as may be defined in two-dimensions). In the example of FIG. 11, the lubricant deflector plate 1700 is substantially planar and does not include a lip. In the example of FIG. 7 and/or the example of FIG. 11, a material such as a metal or alloy may be stamped to form the lubricant deflector plate 700 or 1700.

As shown in FIG. 11, the effective opening 1750 can be a single contiguous opening defined by a boundary, which may include, for example, curved and/or flat portions (see, e.g., the flat portion 1754 as may be associated with a drain passage). As an example, the effective opening 1750 may be formed via a plurality of openings where the plurality of openings effectively define the effective opening with respect to an azimuthal angle. In FIG. 11, an azimuthal angle $\phi$ is shown as being defined with respect to an axis of the opening 1702, which upon assembly, can be substantially aligned with the axis of the through bore portion 383 of the housing 380 (e.g., FIG. 5 or FIG. 10). As shown, the azimuthal angle is approximately 150 degrees. As an example, the span of the opening 1750 may be tailored (e.g., selected) based at least in part on orientation of a turbocharger in an engine compartment as defined with respect to gravity. For example, where an offset with respect to gravity exceeds approximately 15 degrees, the opening 1750 can be, in a clockwise and/or counter-clockwise direction, greater than approximately 15 degrees. As an example, the opening 1750 may be asymmetric and selected to be asymmetric based in a direction of tilt (e.g., angular offset) with respect to gravity.

Various features of the lubricant deflector plate 1700 can be defined with respect to a cylindrical coordinate system. For example, the opening 1702 can be defined by the radius $r_i$ and the outer perimeter 1704 can be defined by the radius $r_o$. As shown, the lubricant deflector plate 1700 can be defined in part by an axial dimension $\Delta z$, for example, as a thickness between sides 1710 and 1720 of the lubricant deflector plate 1700.

As an example, a turbocharger can include a housing that includes a compressor side, a turbine side, a through bore that extends between the compressor side and the turbine side, a compressor side recess defined in part by a first radius and a first axial face with respect to an axis of the through bore, a compressor side seal recess defined in part by a second radius and a second axial face with respect to the axis where the compressor side seal recess includes a drain passage, a lubricant inlet, a lubricant outlet, and an interior cavity in fluid communication with the lubricant inlet and the lubricant outlet where, at the compressor side, the interior cavity includes an effective opening at the first axial face that spans an azimuthal angle about the axis; a shaft and turbine wheel assembly that includes a shaft free end and a turbine wheel end; a collar that includes a bore where the shaft is received in the bore of the collar; a compressor side plate disposed at least in part in the compressor side recess where the compressor side plate includes an opening and where the collar is disposed at least in part in the opening; and a lubricant deflector plate disposed between the compressor side plate and the first axial face of the housing where the lubricant deflector plate includes an effective opening that substantially spans the azimuthal angle about the axis and where the lubricant deflector plate defines a seal cavity with respect to the compressor side seal recess. In such an example, the lubricant deflector plate can define at least a portion of the drain passage.

As an example, a drain passage and a lubricant outlet can be located at a substantially common azimuthal angle with respect to an axis of a through bore of a housing of a turbocharger. In such an example, a common azimuthal angle can correspond to an installed orientation of the turbocharger that aligns the drain passage and the lubricant outlet with respect to gravity. In such an example, an effective opening of an interior cavity, at a first axial face that spans an azimuthal angle about the axis, can enlarge a range of installed orientation angles of the turbocharger. For example, where the effective opening spans an azimuthal angle of at least approximately 90 degrees, a range of installed orientation angles of the turbocharger may be in a range from approximately −45 degrees to approximately +45 degrees.

As an example, an effective opening can span an azimuthal angle of at least approximately 130 degrees such that a range of installed orientation angles of a turbocharger is in a range from approximately −65 degrees to approximately +65 degrees.

As an example, an effective opening can span an azimuthal angle of at least approximately 170 degrees such that a range of installed orientation angles of a turbocharger is in a range from approximately −85 degrees to approximately +85 degrees.

As an example, a lubricant deflector plate can be a planar plate. As an example, a lubricant deflector plate can include a planar portion and a rim (e.g., a lip, etc.) that extends axially outwardly from the planar portion.

As an example, a compressor side plate can include an outer surface and an annular groove in the outer surface where the annular groove receives a seal element that forms a seal with respect to a surface of a housing that defines in part a compressor side recess of the housing.

As an example, a turbocharger can include at least one seal element disposed between a collar and a compressor side plate. For example, consider at least one seal element that is or that includes at least one piston ring.

As an example, a turbocharger can include a journal bearing. For example, a journal bearing may be a unitary journal bearing that includes a compressor side journal and a turbine side journal. Or, for example, a journal bearing may be a bearing system that includes a compressor side journal bearing and a turbine side journal bearing.

As an example, a turbocharger can include a housing that is a cast housing where an effective opening at a first axial face spans an azimuthal angle about an axis of a through bore of the housing (e.g., a journal bearing bore) that is formed via a cast opening that corresponds to and that is formed by at least one casting core (e.g., a sand core, etc.).

As an example, a turbocharger can include a lubricant deflector plate that includes features that can be defined as eyes, a nose and a smile where, for example, the eyes are bolt openings, where the nose is a shaft opening and where an effective opening that substantially spans an azimuthal angle forms the smile. Such a lubricant deflector plate may be referred to as a smiling lubricant deflector plate.

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. A turbocharger comprising:
   a housing that comprises
      a compressor side,
      a turbine side,
      a through bore that extends between the compressor side and the turbine side,
      a compressor side recess defined in part by a first radius and a first axial face with respect to an axis of the through bore,
      a compressor side seal recess defined in part by a second radius and a second axial face with respect to the axis wherein the compressor side seal recess comprises a drain passage,
      a lubricant inlet,
      a lubricant outlet, and
      an interior cavity in fluid communication with the lubricant inlet and the lubricant outlet wherein, at the compressor side, the interior cavity comprises an interior cavity effective opening at the first axial face that spans an azimuthal angle about the axis of at least 90 degrees, wherein the housing comprises a cast housing wherein the interior cavity effective opening at the first axial face that spans the azimuthal angle about the axis comprises a cast opening;
   a shaft and turbine wheel assembly that comprises a shaft free end and a turbine wheel end;
   a collar that comprises a bore wherein the shaft is received in the bore of the collar;
   a compressor side plate disposed at least in part in the compressor side recess wherein the compressor side plate comprises an opening and wherein the collar is disposed at least in part in the opening; and
   a lubricant deflector plate disposed between the compressor side plate and the first axial face of the housing wherein the lubricant deflector plate comprises a lubricant deflector plate effective opening that spans an azimuthal angle about the axis of at least 90 degrees, wherein the interior cavity effective opening and the lubricant deflector plate effective opening at least partially overlap to form at least one gas passage, and wherein the lubricant deflector plate defines a seal cavity with respect to the compressor side seal recess.

2. The turbocharger of claim 1 wherein the lubricant deflector plate defines at least a portion of the drain passage.

3. The turbocharger of claim 1 wherein the drain passage and the lubricant outlet are located at a substantially common azimuthal angle with respect to the axis.

4. The turbocharger of claim 3 wherein the common azimuthal angle corresponds to an installed orientation of the turbocharger that aligns the drain passage and the lubricant outlet with respect to gravity.

5. The turbocharger of claim 1 wherein the interior cavity effective opening, at the first axial face that spans the azimuthal angle about the axis, enlarges a range of installed orientation angles of the turbocharger.

6. The turbocharger of claim 5 wherein the range of installed orientation angles of the turbocharger comprises a range from −45 degrees to +45 degrees.

7. The turbocharger of claim 5 wherein the interior cavity effective opening spans an azimuthal angle of at least 130 degrees and wherein the range of installed orientation angles of the turbocharger comprises a range from −65 degrees to +65 degrees.

8. The turbocharger of claim 5 wherein the interior cavity effective opening spans an azimuthal angle of at least 170 degrees and wherein the range of installed orientation angles of the turbocharger comprises a range from −85 degrees to +85 degrees.

9. The turbocharger of claim 1 wherein the lubricant deflector plate comprises a planar plate.

10. The turbocharger of claim 1 wherein the lubricant deflector plate comprises a planar portion and a rim that extends axially outwardly from the planar portion.

11. The turbocharger of claim 1 wherein the compressor side plate comprises an outer surface and an annular groove in the outer surface wherein the annular groove receives a seal element that forms a seal with respect to a surface of the housing that defines in part the compressor side recess of the housing.

12. The turbocharger of claim 1 comprising at least one seal element disposed between the collar and the compressor side plate.

13. The turbocharger of claim 12 wherein the at least one seal element comprises at least one piston ring.

14. The turbocharger of claim 1 comprising a journal bearing.

15. The turbocharger of claim 14 wherein the journal bearing comprises a unitary journal bearing that comprises a compressor side journal and a turbine side journal.

16. The turbocharger of claim 1 wherein the cast opening corresponds to and is formed by at least one casting core.

17. The turbocharger of claim 1 wherein the lubricant deflector plate comprises eyes, a nose and a smile wherein the eyes comprise bolt openings, wherein the nose comprises a shaft opening and wherein the lubricant deflector plate effective opening forms the smile.

* * * * *